US008526155B2

(12) United States Patent
Kinoshita et al.

(10) Patent No.: US 8,526,155 B2

(45) Date of Patent: Sep. 3, 2013

(54) PHASE-CONTROL SWITCHGEAR AND PHASE-CONTROL METHOD FOR SWITCHGEAR

(75) Inventors: Sadayuki Kinoshita, Chiyoda-ku (JP); Kenji Kamei, Chiyoda-ku (JP); Tomohito Mori, Chiyoda-ku (JP); Hiroki Ito, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 308 days.

(21) Appl. No.: 13/129,690

(22) PCT Filed: Dec. 25, 2008

(86) PCT No.: PCT/JP2008/073549

§ 371 (c)(1), (2), (4) Date: May 17, 2011

(87) PCT Pub. No.: WO2010/073331

PCT Pub. Date: Jul. 1, 2010

(65) Prior Publication Data

US 2011/0228437 A1 Sep. 22, 2011

(51) Int. Cl.

| | |
|---|---|
| ***H01H 73/00*** | (2006.01) |
| *H02H 7/00* | (2006.01) |
| *H02H 3/00* | (2006.01) |
| *G05D 17/00* | (2006.01) |

(52) U.S. Cl.

USPC ............... 361/115; 361/107; 361/79; 361/85; 700/293

(58) Field of Classification Search

USPC ...................... 361/115, 107, 79, 85; 700/293

See application file for complete search history.

(56) References Cited

U.S. PATENT DOCUMENTS 6,212,446 B1 4/2001 Sato 7,259,947 B2 * 8/2007 Kinoshita et al. ............... 361/85

FOREIGN PATENT DOCUMENTS

| | | | |
|---|---|---|---|
| JP | 56-117540 | A | 9/1981 |
| JP | 62-077016 | A | 4/1987 |
| JP | 62-089421 | A | 4/1987 |
| JP | 7-131926 | A | 5/1995 |

(Continued)

OTHER PUBLICATIONS

International Search Report (PCT/ISA/210) issued on Apr. 14, 2009, by Japanese Patent Office as the International Searching Authority for International Application No. PCT/JP2008/073549.

*Primary Examiner* — Jared Fureman

*Assistant Examiner* — Lucy Thomas

(74) *Attorney, Agent, or Firm* — Buchanan Ingersoll & Roooney PC

(57) ABSTRACT

A phase-control switchgear includes a circuit breaker, a phase difference detection unit, a storage unit, and a circuit breaker control unit. The phase difference detection unit detects a phase difference between voltages of a specific phase (U-phase) of buses to which three-phase generators are respectively connected, at a plurality of time points. The storage unit stores the detected phase differences. When the three-phase generators are out of synchronization, the circuit breaker control unit estimates a breaking time point at which the phase difference between the voltages of the U-phase of the buses will be in the range of not less than −80° and not more than 80°, based on the phase differences at the plurality of time points stored in the storage unit. The circuit breaker control unit opens the circuit breaker to break a current at the estimated breaking time point. This makes it possible to suppress a transient voltage generated between electrodes of the circuit breaker after the current is broken.

9 Claims, 6 Drawing Sheets

(56) References Cited

FOREIGN PATENT DOCUMENTS

| | | | |
|---|---|---|---|
| JP | 7-298498 | A | 11/1995 |
| JP | 8-023627 | A | 1/1996 |
| JP | 10-336883 | A | 12/1998 |
| JP | 2000-261954 | A | 9/2000 |
| JP | 2000-341859 | A | 12/2000 |
| JP | 2006-238526 | A | 9/2006 |
| JP | 2007-060870 | A | 3/2007 |

* cited by examiner

PHASE-CONTROL SWITCHGEAR AND PHASE-CONTROL METHOD FOR SWITCHGEAR

TECHNICAL FIELD

The present invention relates to a phase-control switchgear that breaks a current at a desired phase and a phase-control method for the switchgear, and in particular to a device and a method for suppressing a transient voltage generated by breaking a current flowing through a switchgear when step-out occurs between generators on both sides of the switchgear.

BACKGROUND ART

As a device for detecting step-out of an electric power system, for example, a device described in Japanese Patent Laying-Open No. 2007-60870 (Patent Document 1) has been known. In a plurality of electric power systems each including at least one generator and bus and coordinated with each other by connecting the buses via a link line, the device predicts step-out of the generators. In particular, the device predicts that step-out will occur if the generators continue operation, based on a voltage of a bus and a current flowing from the link line to the bus.

Patent Document 1: Japanese Patent Laying-Open No. 2007-60870

DISCLOSURE OF THE INVENTION

Problems to be Solved by the Invention

When a step-out detection device as described above predicts step-out, the step-out detection device outputs a breaking instruction to a switchgear provided to a link line. In this case, a current is broken by the switchgear, independently of a phase difference between voltages on both sides of the switchgear. As a result, a transient voltage exceeding an upper limit value prescribed by step-out current switching test duty in alternating current (AC) circuit breaker standards (JEC-2300, IEC62271-100, IEEE C37.079) is generated, depending on timing of breaking the current by the switchgear.

The present invention has been made in consideration of the above problem, and one object of the present invention is to provide a phase-control switchgear capable of suppressing a transient voltage generated after a current is broken, and a method of controlling the switchgear.

Means for Solving the Problems

According to an aspect, the present invention is directed to a phase-control switchgear provided to a multi-phase AC power transmission line connecting between first and second buses, including a circuit breaker, a phase difference detection unit, a storage unit, and a control unit. Here, first and second multi-phase generators are connected to the first and second buses, respectively. The circuit breaker breaks a current flowing through the power transmission line. The phase difference detection unit detects a phase difference between a voltage of a specific phase of the first bus and a voltage of one of a plurality of phases of the second bus that is identical to the specific phase, at a plurality of time points. The storage unit stores the phase differences at the plurality of time points detected by the phase difference detection unit. When the control unit receives a breaking instruction for the circuit breaker, the control unit estimates a breaking time point at which the phase difference between the voltage of the specific phase of the first bus and the voltage of one of the plurality of phases of the second bus that is identical to the specific phase will be a predetermined phase difference, based on the phase differences at the plurality of time points stored in the storage unit, and opens the circuit breaker to break the current at the breaking time point.

According to another aspect, the present invention is directed to a phase-control method for a switchgear provided to a multi-phase AC power transmission line connecting between first and second buses. Here, first and second multi-phase generators are connected to the first and second buses, respectively. The method of controlling the switchgear according to the present invention includes: a step of detecting a phase difference between a voltage of a specific phase of the first bus and a voltage of one of a plurality of phases of the second bus that is identical to the specific phase, at a plurality of time points; a step of storing the detected phase differences at the plurality of time points; a step of estimating, when a breaking instruction for the switchgear is received, a breaking time point at which the phase difference between the voltage of the specific phase of the first bus and the voltage of one of the plurality of phases of the second bus that is identical to the specific phase will be a predetermined phase difference, based on the phase differences at the plurality of time points stored in the step of storing; and a step of opening the switchgear to break a current at the breaking time point.

Effects of the Invention

According to the present invention, since timing of opening the circuit breaker is determined to break the current when the phase difference is a predetermined phase difference, based on the phase differences at the plurality of time points stored in the storage unit, a transient voltage generated after the current is broken can be suppressed.

DESCRIPTION OF THE REFERENCE SIGNS

Figure 1:
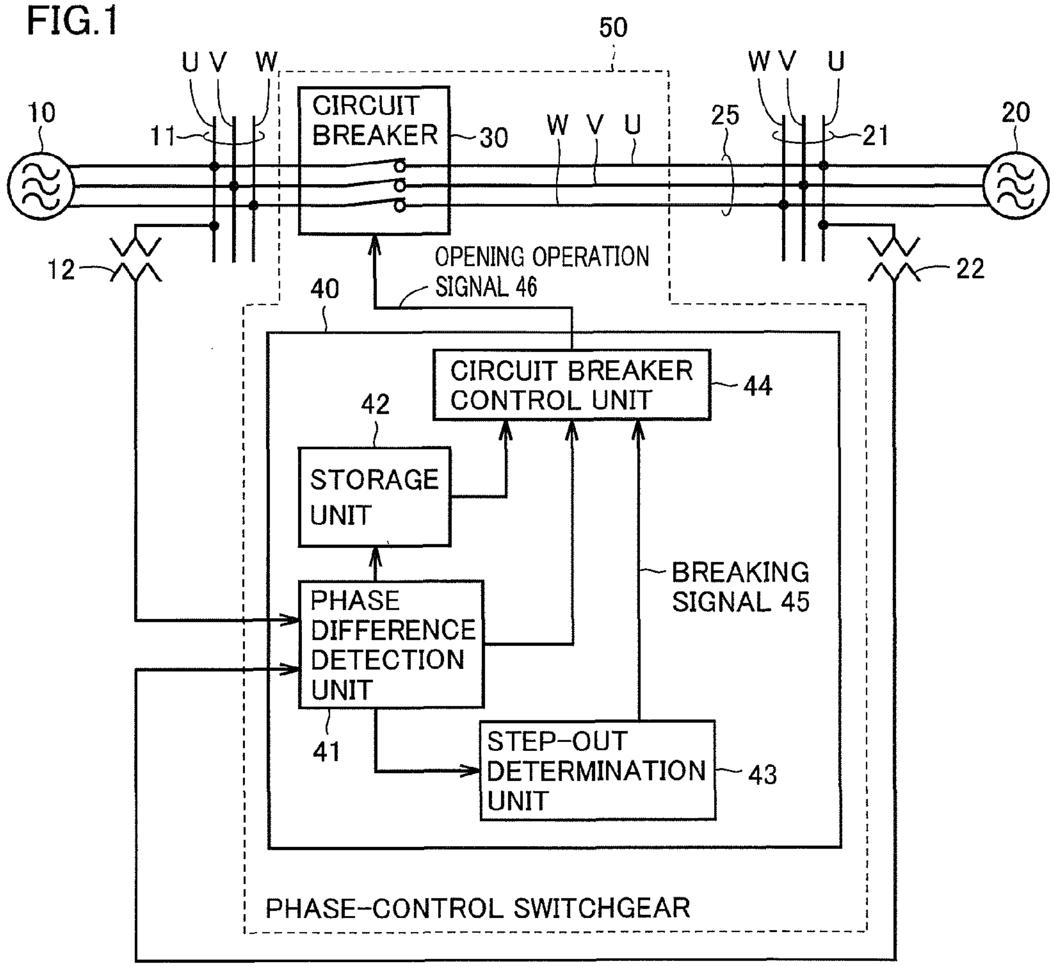
FIG. 1 is a block diagram showing a configuration of a phase-control switchgear 50 according to Embodiment 1 of the present invention.

10, 20: three-phase generator, 11, 21: bus, 12, 22: instrument transformer, 25: power transmission line, 30, 30A: circuit breaker, 40, 40A: computer, 41: phase difference detection unit, 42: storage unit, 43: step-out determination unit, 44: circuit breaker control unit, 45: breaking signal, 46: opening operation signal, 50, 50A: phase-control switchgear, 70: step-out determination device, 110, 120: single-phase generator, 111, 121: bus, 125: power transmission line.

BEST MODES FOR CARRYING OUT THE INVENTION

Hereinafter, embodiments of the present invention will be described in detail with reference to the drawings. It is to be noted that identical or corresponding parts will be designated by the same reference numerals, and the description thereof will not be repeated.

Embodiment 1

FIG. 1 is a block diagram showing a configuration of a phase-control switchgear 50 according to Embodiment 1 of the present invention. Referring to FIG. 1, phase-control switchgear 50 is provided to a three-phase AC power transmission line 25 connecting a first bus 11 and a second bus 21. A first three-phase generator 10 is connected to bus 11, and a second three-phase generator 20 is connected to bus 21. Further, an instrument transformer 12 for measuring a voltage is provided to bus 11, at a U-phase among U-, V-, and W-phases. Similarly, an instrument transformer 22 is provided to bus 21, at the same U-phase. Although the U-phase is selected in FIG. 1 as a specific phase to which instrument transformers 12, 22 are provided, any of the U-, V-, and W-phases may be selected.

Phase-control switchgear 50 includes a circuit breaker (CB) 30 that breaks a current flowing through power transmission line 25 in response to an opening operation signal 46, and a computer 40 for controlling circuit breaker 30. Computer 40 determines whether or not three-phase generators 10, 20 are out of synchronization based on the voltages of the U phase of buses 11, 21 detected by instrument transformers 12, 22, respectively.

Here, loss of synchronization (also referred to as step-out) is caused by a generator continuing acceleration or deceleration when a balance between a mechanical input and an electrical output of the generator is lost. For example, if a short-circuit or a grounding fault occurs at power transmission line 25 in the vicinity of three-phase generator 10, an electrical output of three-phase generator 10 is decreased, and thus three-phase generator 10 continues acceleration, resulting in step-out when the acceleration exceeds a limit. Generally, if a phase difference between the voltages of a specific phase (here, the U-phase) of buses 11, 21 exceeds 180°, such a state is determined as a step-out state. Since the generator continues acceleration or deceleration even after it is determined that step-out has occurred, a phase shift between the voltages of the specific phase of buses 11, 21 is further increased.

In the description below, the magnitude of the phase shift between the voltages of the specific phase of buses 11, 21 caused by step-out will be referred to as a step-out phase angle. Specifically, the step-out phase angle means a phase shift from a state where the voltages of buses 11, 21 are completely in synchronization. For example, a step-out phase angle of 360° means that there occurs a phase shift shifted from an original synchronized state by one cycle. In addition, a step-out phase angle of 720° means that there occurs a phase shift shifted from the original synchronized state by two cycles.

When computer 40 determines that step-out has occurred, computer 40 activates opening operation signal 46 to be output to circuit breaker 30, at appropriate timing. The timing on this occasion is determined to minimize a transient voltage (referred to as a recovery voltage) generated between electrodes of circuit breaker 30 after the current is broken, based on the phase difference between the detected voltages of the U-phase of buses 11, 21. The magnitude of the recovery voltage varies depending on the phase difference between the voltages of the U-phase of buses 11, 21 when circuit breaker 30 breaks the current.

Figure 2:
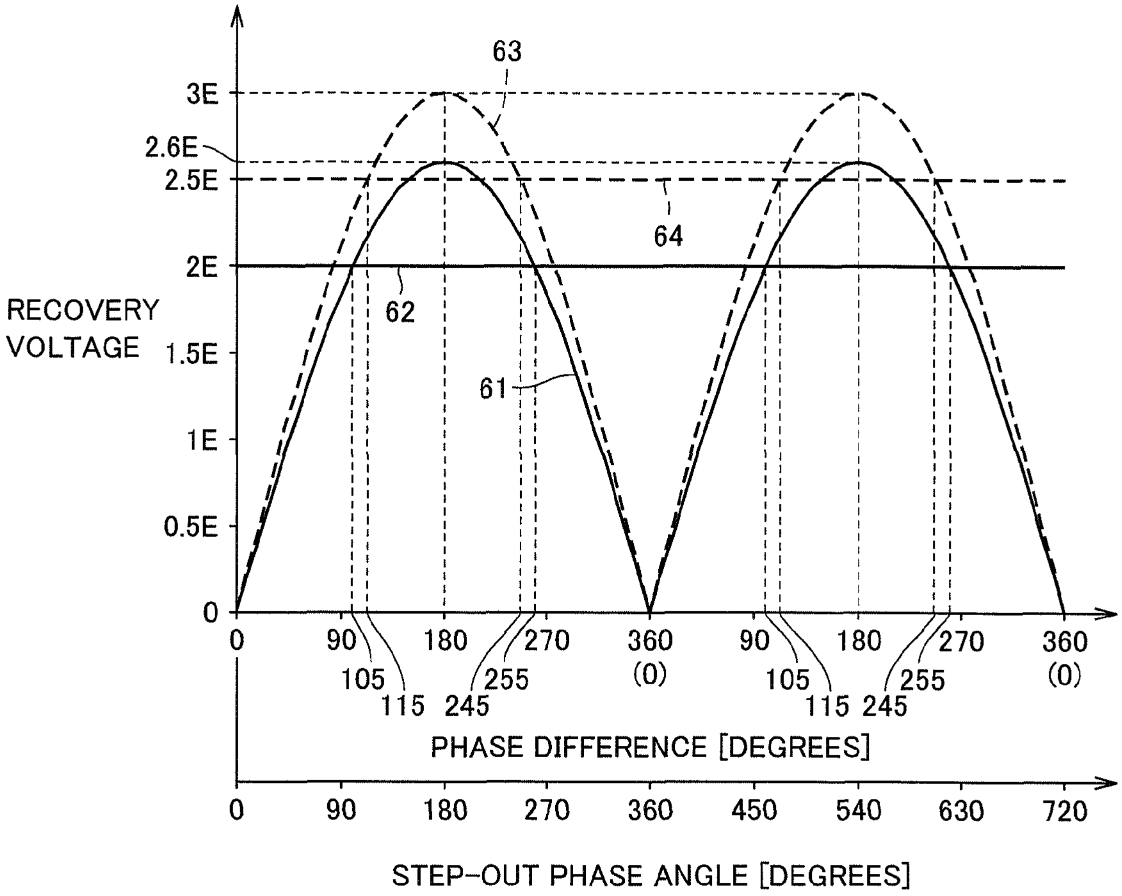
FIG. 2 is a view showing the relationship between a phase difference between voltages of a U-phase of buses 11, 21 and a recovery voltage.

FIG. 2 is a view showing the relationship between the phase difference between the voltages of the U-phase of buses 11, 21 and the recovery voltage. The axis of ordinates in FIG. 2 represents the magnitude of the recovery voltage based on a phase voltage E of each of buses 11, 21. The axis of abscissas in FIG. 2 represents the phase difference between the voltages of the U-phase detected between buses 11, 21. The axis of abscissas in FIG. 2 also represents the step-out phase angle. The phase difference between the voltages of buses 11, 21 actually detected when the step-out phase angle is 360° and 720° is 0°.

The recovery voltage indicated by curves 61, 63 in FIG. 2 is given as a value obtained by multiplying a maximum value of a difference between the voltages of buses 11, 21 by a first-phase breaking coefficient prescribed in the AC circuit breaker standards (JEC-2300, IEC62271-100, IEEE C37.079). The first-phase breaking coefficient is 1.3 in the case of an effectively-grounded system (curve 61 in the figure), and 1.5 in the case of a non-effectively grounded system (curve 63 in the figure).

As shown in FIG. 2, the recovery voltage has a maximum magnitude in a complete step-out state where the voltage of the U-phase of bus 11 and the voltage of the U-phase of bus 21 have opposite phases (i.e., a phase difference of 180 degrees). On this occasion, since the maximum value of the difference between the voltage of the U-phase of bus 11 and the voltage of the U-phase of bus 21 is 2.0E (E represents the phase voltage of each of buses 11, 21), the maximum value of the recovery voltage is 2.6E in the case of the effectively-grounded system (curve 61 in the figure), and 3.0E in the case of the non-effectively grounded system (curve 63 in the figure).

According to the provision of the step-out current switching test duty in the AC circuit breaker standards (JEC-2300, IEC62271-100, IEEE C37.079), the upper limit value of the recovery voltage is prescribed as 2.5E (a straight line 64 in the figure) for a circuit breaker for the non-effectively grounded system, and 2.0E (a straight line 62 in the figure) for a circuit breaker for the effectively-grounded system.

Specifically, in the case of FIG. 2, the phase difference between the voltages of the U-phase of buses 11, 21 when the magnitude of the recovery voltage is equal to the upper limit value of the standards is about 115 degrees and 245 degrees in the case of the non-effectively grounded system, and about 105 degrees and 255 degrees in the case of the effectively-grounded system.

Therefore, a phase difference θ between the voltages of the U-phase of buses 11, 21 accepted by the step-out current switching test duty in the case of the non-effectively grounded system is represented as:

$$-115° \leqq \theta \leqq 115° \quad (1).$$

The range of phase difference θ in the above formula (1) corresponds to the range of a step-out phase angle Θ represented for example as:

$$245° \leqq \Theta \leqq 475°, 605° \leqq \Theta \leqq 835° \quad (2).$$

In addition, phase difference θ accepted in the case of the effectively-grounded system is represented as:

$$-105° \leqq \theta \leqq 105° \quad (3).$$

The range of phase difference θ in the above formula (3) corresponds to the range of step-out phase angle Θ represented for example as:

$$255° \leqq \Theta \leqq 465°, 615° \leqq \Theta \leqq 825° \quad (4).$$

Accordingly, unless circuit breaker 30 breaks the current such that the phase difference is within this range of phase difference θ, a voltage exceeding the upper limit value of the standards is generated.

Thus, computer 40 according to Embodiment 1 controls timing of opening circuit breaker 30 such that the current flowing through power transmission line 25 is broken when phase difference θ between the voltages of the U-phase of buses 11, 21 is in the range of:

$$-80° \leqq \theta \leqq 80° \quad (5),$$

considering variations in a breaking time period for the circuit breaker. The range of phase difference θ in the above formula (5) corresponds to the range of step-out phase angle Θ represented for example as:

$$280° \leqq \Theta \leqq 440°, 640° \leqq \Theta \leqq 800° \quad (6).$$

The most preferable case is that phase difference θ is 0° (the step-out phase angle is 360°, 720°, and the like), because the magnitude of the recovery voltage is 0.

Hereinafter, a method of controlling timing of opening circuit breaker 30 will be described in detail. Referring to FIG. 1 again, when seen functionally, computer 40 includes a phase difference detection unit 41, a storage unit 42, a step-out determination unit 43, and a circuit breaker control unit (CB control unit) 44. Functions of these components are implemented by executing a program in a Central Processing Unit (CPU) of computer 40.

Phase difference detection unit 41 successively detects the phase difference between the voltage of the U-phase of bus 11 measured by instrument transformer 12 and the voltage of the U-phase of bus 21 measured by instrument transformer 22. On this occasion, outputs of instrument transformers 12, 22 are subjected to digital conversion by an Analog to Digital (A/D) converter (not shown) built in computer 40, and input into phase difference detection unit 41. Specifically, phase difference detection unit 41 detects the phase difference between the voltage of the U-phase of bus 11 and the voltage of the U-phase of bus 21 at each cycle of the voltage of the U-phase of bus 11.

Storage unit 42 sequentially stores data of the phase difference detected by phase difference detection unit 41 at each cycle of the voltage of the U-phase of bus 11. Storage unit 42 includes a storage device (not shown) built in computer 40.

Step-out determination unit 43 determines whether or not step-out has occurred between three-phase generators 10 and 20, and if it determines that step-out has occurred, it outputs an activated breaking signal 45 (breaking instruction) to circuit breaker control unit 44. A specific criterion for determining occurrence of step-out is that the phase difference detected by phase difference detection unit 41 exceeds 180 degrees (i.e., a complete step-out state).

When breaking signal 45 is switched into an active state, circuit breaker control unit 44 determines an approximate curve of a temporal change in the phase difference based on data of the phase difference at a present time point received from phase difference detection unit 41 and data of a plurality of phase differences up to the present time point stored in storage unit 42. As an approximation technique in this case, n-order (n is an integer) polynomial approximation may be used, or a known time-series prediction technique such as an Auto-Regressive (AR) model may be used.

Circuit breaker control unit 44 estimates a breaking time point at which the phase difference between the voltages of the U-phase of buses 11, 21 will be a preset appropriate phase difference, by extrapolating the determined approximate curve. The appropriate phase difference is set to be included in the range represented by the above formula (5). Preferably, the appropriate phase difference is set to be equal to 0 degrees. Thereafter, circuit breaker control unit 44 activates opening operation signal 46 to be output to circuit breaker 30 at timing such that the current will be broken at the estimated breaking time point, considering the breaking time period for circuit breaker 30.

Figure 3:
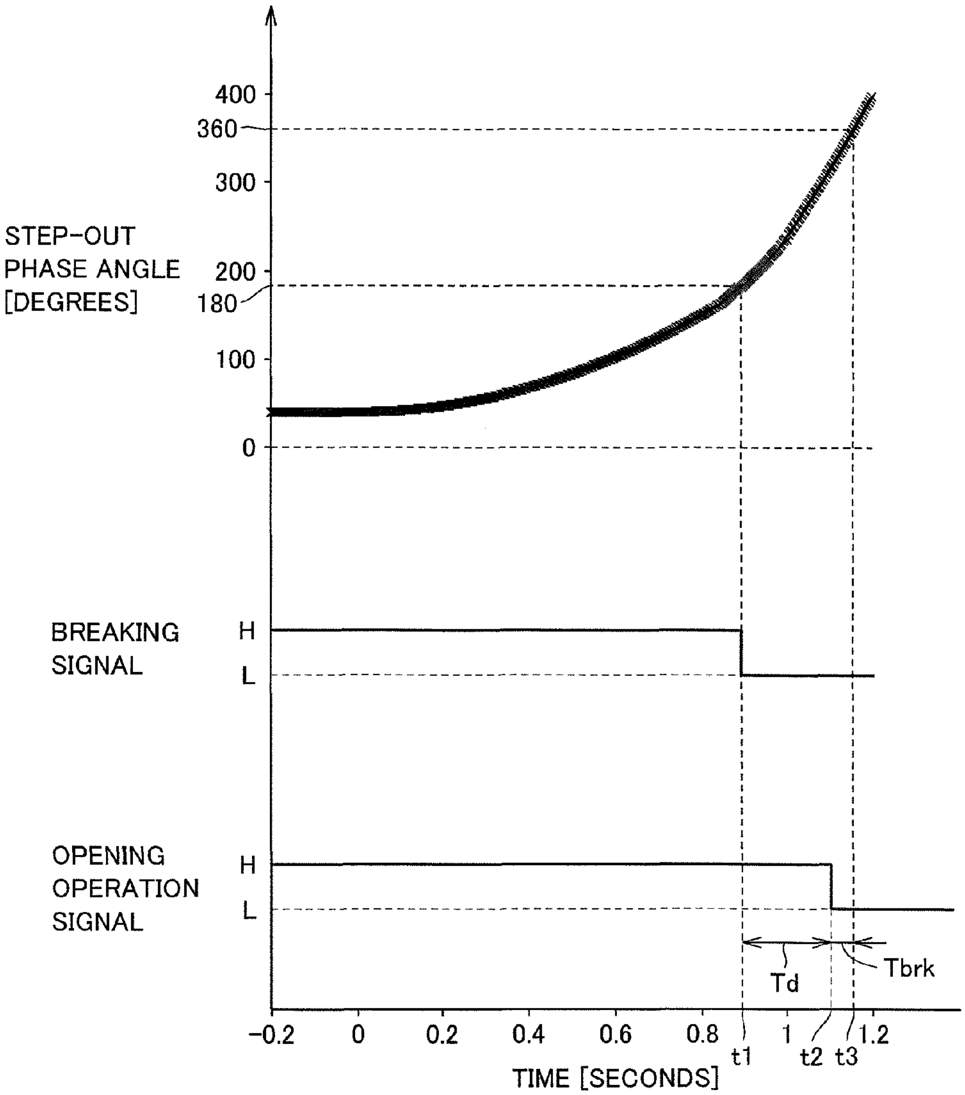
FIG. 3 is a view for explaining timing of activating an opening operation signal 46 to be output to a circuit breaker 30.

FIG. 3 is a view for explaining timing of activating opening operation signal 46 to be output to circuit breaker 30. FIG. 3 shows, from the top, a temporal change in the phase difference output from phase difference detection unit 41 in FIG. 1 (represented by the step-out phase angle in FIG. 3), a waveform of breaking signal 45 output from step-out determination unit 43 in FIG. 1, and a waveform of opening operation signal 46 output from circuit breaker control unit 44 in FIG. 1.

Referring to FIGS. 1 and 3, at a time point t1 when the phase difference between the voltages of the U-phase of buses 11, 21 reaches 180 degrees, step-out determination unit 43 switches breaking signal 45 from an H level to an L level to activate breaking signal 45.

Here, generally, a breaking time period Tbrk for circuit breaker 30 is given as the sum of an opening time period from when circuit breaker 30 receives opening operation signal 46 to when a main contact point is opened and an arc time period after the main contact point is opened. Breaking time period Tbrk for typical circuit breaker 30 is about 50 milliseconds. Therefore, if circuit breaker control unit 44 activates opening operation signal 46 immediately after time point t1 at which breaking signal 45 is activated, the current is broken when the step-out phase angle is around 210°. In this case, a voltage exceeding the upper limit value of the recovery voltage prescribed by the step-out current switching test duty described above is generated.

Thus, circuit breaker control unit 44 estimates a breaking time point t3 at which the phase difference between the voltages of the U-phase of buses 11, 21 will be an appropriate phase difference of 0° (corresponding to a step-out phase angle of 360°), based on the temporal change in the phase difference between the voltages of buses 11, 21 prior to time point t1 at which breaking signal 45 is activated. Then, circuit breaker control unit 44 switches opening operation signal 46 to an L level to activate it at a time point t2 obtained by subtracting breaking time period Tbrk for circuit breaker 30 from estimated breaking time point t3. A time period from time point t1 to time point t2 is a delay time period Td from when breaking signal 45 is activated to when opening operation signal 46 is activated. As a result, the current is broken when the phase difference between the voltages of the U-phase of buses 11, 21 is around 0° (the step-out phase angle is around 360°), and thus the voltage generated between the electrodes of circuit breaker 30 after the current is broken is substantially 0, satisfying the provision of the step-out current switching test duty described above.

Figure 4:
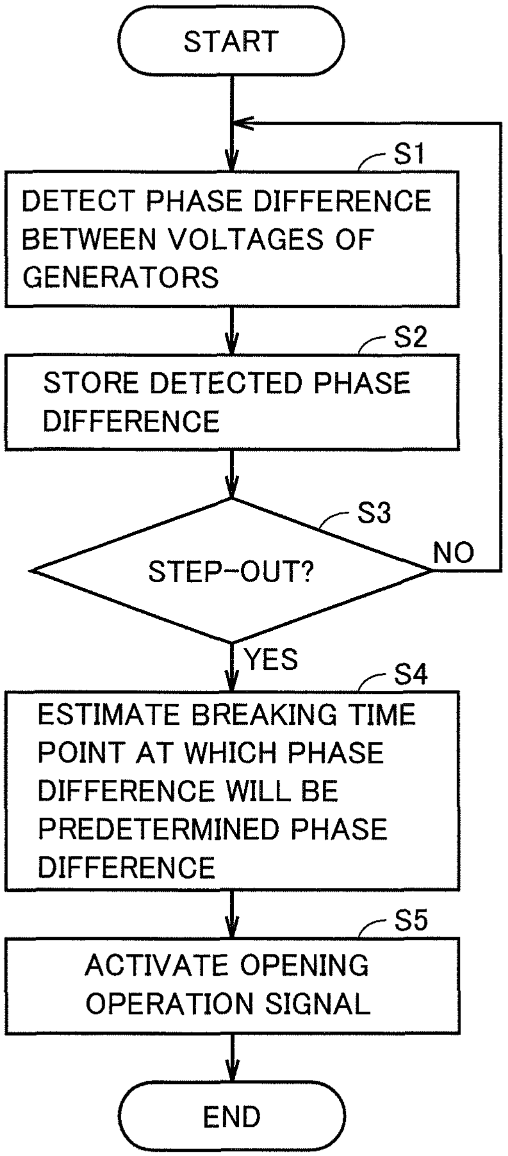
FIG. 4 is a flowchart illustrating a procedure for controlling circuit breaker 30 by a computer 40 in FIG. 1.

FIG. 4 is a flowchart illustrating a procedure for controlling circuit breaker 30 by computer 40 in FIG. 1. Hereinafter, the procedure for controlling circuit breaker 30 will be described, summarizing the above description.

Referring to FIGS. 1 and 4, in step S1, phase difference detection unit 41 of computer 40 detects a phase difference between the voltages of the U-phase of buses 11, 21 at each cycle of the voltage of the U-phase of bus 11.

In subsequent step S2, storage unit 42 of computer 40 stores the phase difference detected by phase difference detection unit 41.

In subsequent step S3, step-out determination unit 43 of computer 40 determines whether or not the phase difference detected by phase difference detection unit 41 is in a step-out state exceeding 180°. If the phase difference is not in the step-out state (NO in step S3), the procedure returns to step S1, and steps S1 and S2 are repeated again. In this case, the phase differences detected at a plurality of time points are sequentially stored in storage unit 42. On the other hand, if step-out determination unit 43 determines that the phase difference is in the step-out state (YES in step S3), the procedure proceeds to step S4. In this case, step-out determination unit 43 activates breaking signal 45, and activated breaking signal 45 is received by circuit breaker control unit 44.

In step S4, circuit breaker control unit 44 estimates a breaking time point at which the phase difference between the voltages of buses 11, 21 will be a preset appropriate phase difference, based on data of the phase difference at a present time point and data of the phase differences at the plurality of time points prior to the present time point stored in storage unit 42. Here, the appropriate phase difference is set to satisfy the provision of the step-out current switching test duty in the AC circuit breaker standards, and is included in the range represented by the above formula (5), as described above.

In subsequent step S5, circuit breaker control unit 44 activates opening operation signal 46 at a time point obtained by subtracting the breaking time period for circuit breaker 30 from the breaking time point. As a result, the current is broken by circuit breaker 30 at substantially the breaking time point.

As described above, phase-control switchgear 50 according to Embodiment 1 controls the timing of activating opening operation signal 46 such that the current is broken when the phase difference between the voltages of the U-phase of buses 11, 21 on both sides of circuit breaker 30 is an appropriate phase difference, considering the breaking time period for circuit breaker 30. The appropriate phase difference is set to be included in the range represented by the above formula (5). As a result, a transient voltage generated between the electrodes of circuit breaker 30 after the current is broken can be suppressed to be not more than the upper limit value of the recovery voltage prescribed by the step-out current switching test duty in the AC circuit breaker standards.

In Embodiment 1 described above, a case where circuit breaker 30 is provided to power transmission line 25 connecting two three-phase generators 10 and 20 has been described. More generally, in a case where multiple three-phase generators are connected to an electric power system, phase-control switchgear 50 controls timing of breaking a current by circuit breaker 30 by detecting a phase difference between voltages of a specific phase of buses on both sides of circuit breaker 30 to which nearby three-phase generators are connected.

Further, in phase-control switchgear 50 according to Embodiment 1, an appropriate value of the phase difference between the voltages of the U-phase of buses 11, 21 when the current is broken is set to be in the range represented by the above formula (5) to satisfy the provision of the step-out current switching test duty even if the breaking time period for circuit breaker 30 varies. It is needless to say that, if it is possible to suppress variations in the breaking time period for circuit breaker 30, circuit breaker 30 only needs to be opened such that the current is broken when the phase difference between the voltages of the U-phase of buses 11, 21 is in the range represented by the above formula (1) in the case of the non-effectively grounded system, and in the range represented by the above formula (3) in the case of the effectively-grounded system.

Embodiment 2

Figure 5:
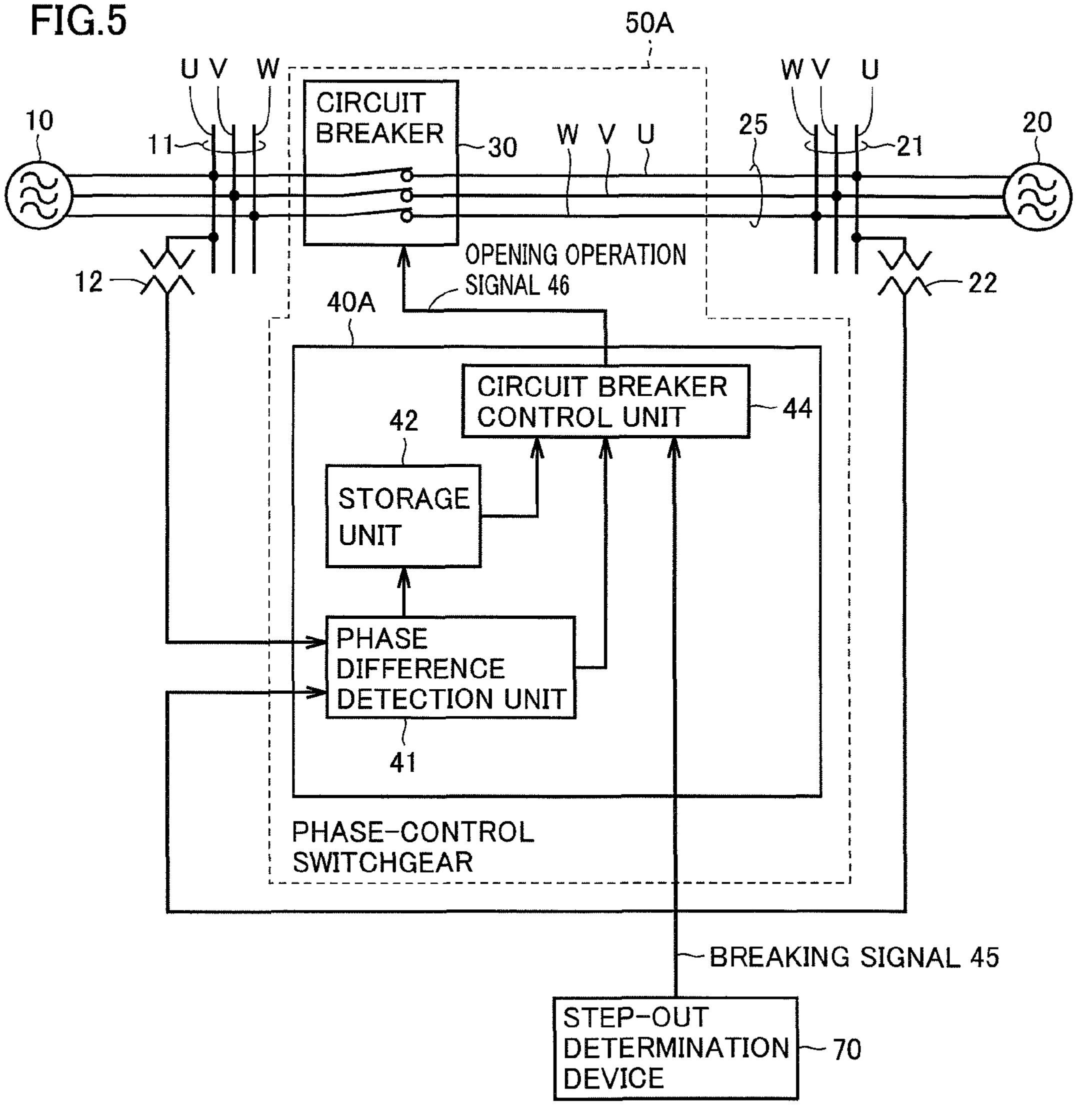
FIG. 5 is a block diagram showing a configuration of a phase-control switchgear 50A according to Embodiment 2 of the present invention.

FIG. 5 is a block diagram showing a configuration of a phase-control switchgear 50A according to Embodiment 2 of the present invention. A computer 40A in FIG. 5 is different from computer 40 in FIG. 1 in that computer 40A does not include step-out determination unit 43. In the case of Embodiment 2, phase-control switchgear 50A breaks a current flowing through power transmission line 25 in response to breaking signal 45 received from an externally provided step-out determination device 70.

Step-out determination device 70 in FIG. 5 can be configured to determine whether step-out has occurred between three-phase generators 10 and 20 based on a phase difference between voltages of a specific phase of buses 11, 21, as in the case of Embodiment 1. Alternatively, step-out determination device 70 can also be configured to determine whether step-out has occurred based on the voltage of bus 11 and the current flowing from power transmission line 25 to bus 11, as in Japanese Patent Laying-Open No. 2007-60870 (Patent Document 1) described above. In any of these cases, step-out determination device 70 outputs activated breaking signal 45 to circuit breaker control unit 44 of phase-control switchgear 50A when it determines that step-out has occurred. Since other components in FIG. 5 are identical to those in FIG. 1, identical or corresponding parts will be designated by the same reference numerals, and the description will not be repeated.

Embodiment 3

Figure 6:
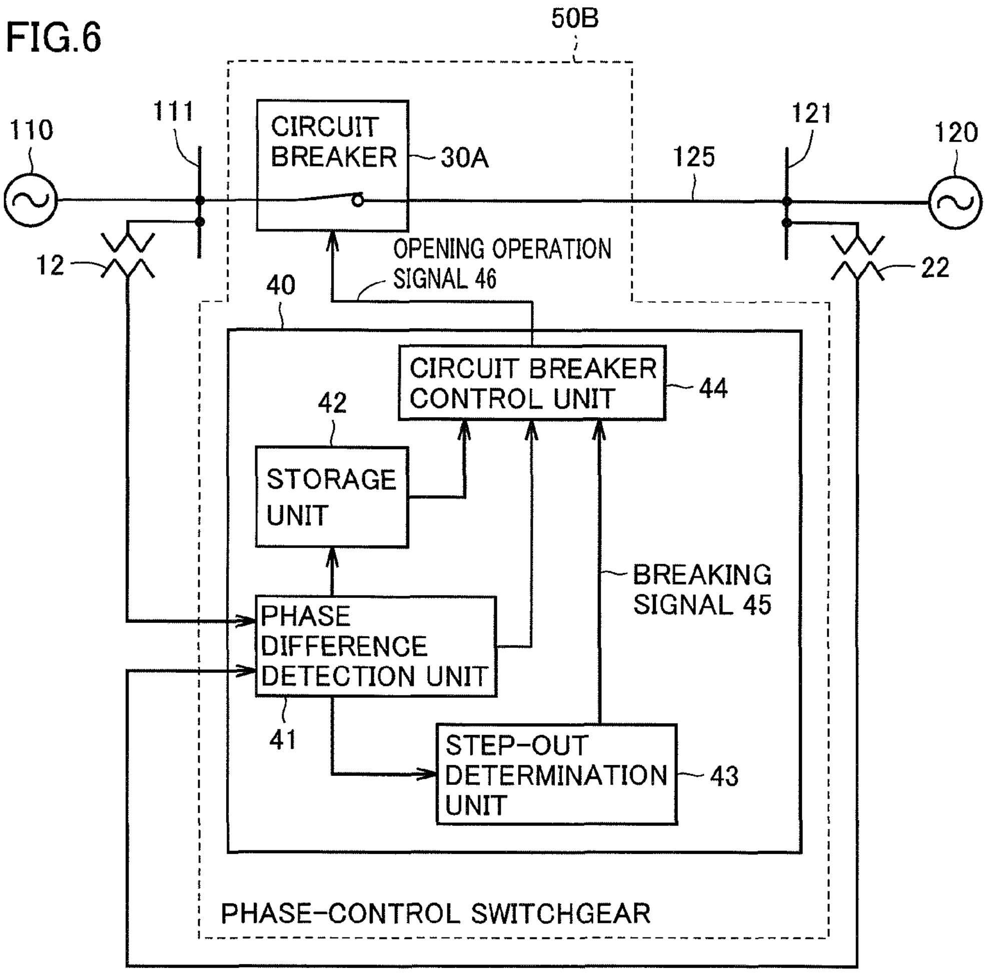
FIG. 6 is a block diagram showing a configuration of a phase-control switchgear 50B according to Embodiment 3 of the present invention.

FIG. 6 is a block diagram showing a configuration of a phase-control switchgear 50B according to Embodiment 3 of the present invention. Referring to FIG. 6, phase-control switchgear 50B is provided to a single-phase AC power transmission line 125 connecting a first bus 111 and a second bus 121. A first single-phase generator 110 is connected to bus 111, and a second single-phase generator 120 is connected to bus 121. Further, instrument transformers 12, 22 for measuring a voltage is provided to buses 111, 121, respectively.

Phase-control switchgear 50B includes a circuit breaker 30A that breaks a current flowing through power transmission line 125 in response to opening operation signal 46, and computer 40 for controlling circuit breaker 30A. Computer 40 determines whether or not single-phase generators 110, 120 are out of synchronization based on the voltages of buses 111, 121 detected by instrument transformers 12, 22, respectively, and if computer 40 determines that single-phase generators 110, 120 are out of synchronization, computer 40 activates opening operation signal 46. Since the configuration and operation of computer 40 are identical to those in Embodiment 1, the description will not be repeated. Also in the case of a single-phase AC electric power system as described above, a transient voltage generated after the current is broken by circuit breaker 30A can be suppressed by the method described in Embodiment 1.

It should be understood that the embodiments disclosed herein are illustrative and non-restrictive in every respect. The scope of the present invention is defined by the scope of the claims, rather than the above description, and is intended to include any modifications within the scope and meaning equivalent to the scope of the claims.

The invention claimed is:

1. A phase-control switchgear provided to a multi-phase AC power transmission line connecting between first and second buses, first and second multi-phase generators being connected to said first and second buses, respectively, said phase-control switchgear comprising:

a circuit breaker breaking a current flowing through said power transmission line;

a phase difference detection unit detecting a phase difference between a voltage of a specific phase of said first bus and a voltage of one of a plurality of phases of said second bus that is identical to said specific phase, at a plurality of time points;

a storage unit storing the phase differences at the plurality of time points detected by said phase difference detection unit; and a control unit, wherein, when said control unit receives a breaking instruction for said circuit breaker, said control unit estimates a breaking time point at which the phase difference between the voltage of said specific phase of said first bus and the voltage of one of the plurality of phases of said second bus that is identical to said specific phase will be a predetermined phase difference, based on the phase differences at the plurality of time points stored in said storage unit, and opens said circuit breaker to break the current at said breaking time point.

2. The phase-control switchgear according to claim 1, wherein said control unit receives said breaking instruction when said first and second generators are out of synchronization, and said predetermined phase difference θ is included in a range of $-80° \leqq \theta \leqq 80°$.

3. The phase-control switchgear according to claim 2, wherein said predetermined phase difference θ is 0°.

4. The phase-control switchgear according to claim 1, further comprising a step-out determination unit determining whether or not said first and second generators are out of synchronization, and outputting said breaking instruction to said control unit when said first and second generators are out of synchronization.

5. The phase-control switchgear according to claim 4, wherein said step-out determination unit determines that said first and second generators are out of synchronization when the phase difference between the voltages of said first and second buses exceeds a predetermined angle.

6. The phase-control switchgear according to claim 5, wherein said predetermined angle is 180°.

7. The phase-control switchgear according to claim 1, wherein said phase difference detection unit detects the phase difference between the voltage of the specific phase of said first bus and the voltage of a phase of said second bus that is identical to said specific phase, at each cycle of the voltage of the specific phase of said first bus.

8. A phase-control switchgear provided to a single-phase AC power transmission line connecting between first and second buses, first and second single-phase generators being connected to said first and second buses, respectively, said phase-control switchgear comprising:

a circuit breaker breaking a current flowing through said power transmission line;

a phase difference detection unit detecting a phase difference between a voltage of said first bus and a voltage of said second bus, at a plurality of time points;

a storage unit storing the phase differences at the plurality of time points detected by said phase difference detection unit; and a control unit, wherein, when said control unit receives a breaking instruction for said circuit breaker, said control unit estimates a breaking time point at which the phase difference between the voltage of said first bus and the voltage of said second bus will be a predetermined phase difference, based on the phase differences at the plurality of time points stored in said storage unit, and opens said circuit breaker to break the current at said breaking time point.

9. A phase-control method for a switchgear provided to a multi-phase AC power transmission line connecting between first and second buses, first and second multi-phase generators being connected to said first and second buses, respectively, said method comprising:

a step of detecting a phase difference between a voltage of a specific phase of said first bus and a voltage of one of a plurality of phases of said second bus that is identical to said specific phase, at a plurality of time points;

a step of storing the detected phase differences at the plurality of time points;

a step of estimating, when a breaking instruction for said switchgear is received, a breaking time point at which the phase difference between the voltage of said specific phase of said first bus and the voltage of one of the plurality of phases of said second bus that is identical to said specific phase will be a predetermined phase difference, based on the phase differences at the plurality of time points stored in said step of storing; and a step of opening said switchgear to break a current at said breaking time point.

* * * * *